Figure 1:
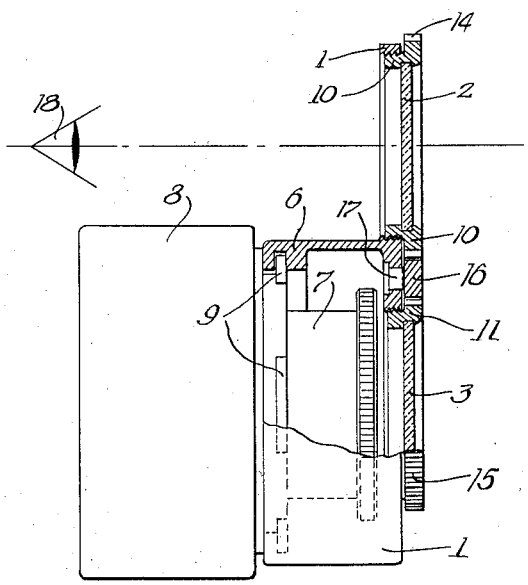

Feb. 20, 1940. H. KÜPPENBENDER 2,190,718

POLARIZER

Filed April 22, 1937

Inventor
Heinz Küppenbender
By B. Singer
Attorney

Patented Feb. 20, 1940

2,190,718

UNITED STATES PATENT OFFICE 2,190,718

POLARIZER

Heinz Küppenbender, Dresden, Germany, assignor to Zeiss Ikon Aktiengesellschaft, Dresden, Germany Application April 22, 1937, Serial No. 138,464
In Germany April 25, 1936

5 Claims. (Cl. 95—64)

The invention relates to improvements in polarizers for photographic purposes and in particular is directed to a device for attaching polarizers to photographic and motion picture cameras.

The principal object of the invention is the provision of a device which contains two polarizing filters, one of which is adapted to be placed in front of the lens of the camera, while the other polarizing filter (analyzer) is adapted to be positioned in front of an eye or eyes of the photographer, who observes the object to be photographed through the filter and adjusts the same until undesirable light reflexes are eliminated.

Another object of the invention is to provide a polarizing filter especially adapted for miniature cameras.

It is also an important object of the invention to mount the two polarizing filters rotatably in a common holder and to operatively connect the two polarizing filters in such a manner that upon rotative adjustment of one filter, for instance the eye filter, the other filter, for instance the lens filter, is simultaneously adjusted to the same extent and in the same direction.

Another object of the invention is to make the entire polarizing device easily attachable and detachable to and from the camera respectively.

Still another object of the invention is to make the polarizing filter which comes to lie in front of the lens of the camera of a material of higher optical quality then that of the polarizing filter through which the user observes the scene to be photographed.

With these and other objects in view the invention consists of the means hereinafter fully described and particularly pointed out in the claims; the accompanying drawing and following description setting forth in detail and by way of example one embodiment of the invention.

Figure 2:
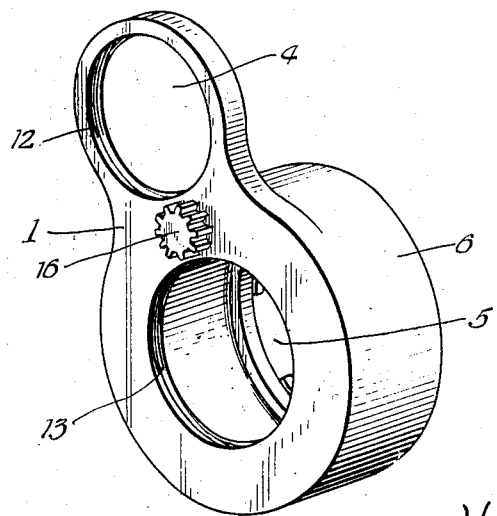

In the drawing:

Fig. 1 is a side elevation view of a miniature camera having attached thereto a polarizing device of the invention, which is shown partly in section, and Fig. 2 is a perspective view of the holder of the polarizing filters, the filters including their mounting rings have been removed.

The polarizing device illustrated in the drawing comprises the two polarizing filters 2 and 3 adjustably mounted in a holder 1. The holder 1 is provided with two spaced and threaded apertures 4 and 5 and with a tubular rearward extension 6 adapted to surround and accommodate the lens system 7 of the camera and adapted to be detachably attached to the camera casing 8 in any convenient manner, for instance as shown by a bayonet joint 9. The tubular extension 6 is arranged coaxially with the aperture 5 which is provided for receiving the polarizing filter 3.

The polarizing filters 2 and 3 are each mounted in a ring 10 and 11 respectively, which are provided with an exterior thread engaging the inner thread 12 and 13 of the apertures 4 and 5 respectively, so as to be rotatably adjustable within the holder 1. The rings 10 and 11 are also provided with gear teeth 14 and 15 at their outer circumference, and these gear teeth are in mesh with a pinion 16 positioned between the two rings 10 and 11. The pinion 16 is rotatably mounted on the holder 1 as shown at 17.

It will be noted that due to the arrangement of the pinion 16, a rotative adjustment of the ring 10 containing the polarizing filter 2 will effect a similar rotative adjustment of the ring 11 in which the polarizing filter 3 is mounted.

In operation, when the polarizing device is attached to the camera casing 5 as shown in Fig. 1, the photographer's eye 18 observes the scene to be photographed through the filter 2 and rotates the latter until the light reflexes are satisfactorily diminished or completely eliminated. During this adjustment the polarizing filter in front of the lens 7 is automatically adjusted to the same extent, and the image appearing in the camera upon the light sensitive layer will be devoid of any disturbing light reflexes, because the same have been eliminated or diminished by the filter 3.

Preferably, the polarizing filter 3 which comes to lie in front of the lens system 7 is made of a material having a higher optical quality than that of the polarizing filter 2. The polarizing filter 3 may be made for instance of a monocrystal (the term "monocrystal" is explained by Bridgman, Proc. Nat. Acad. Wash. 60, 305, 1925 and A. Anderson, J. Am. Chem. Soc. 52, 1003, 1930, which described methods for producing zinc-monocrystals), while the polarizing filter 2, through which the photographer observes the scene, may be made of the well known foils or discs, consisting of a plurality of dichroitic crystals.

What I claim as my invention is:

1. In combination with a camera casing having a lens mount, a holder for a pair of polarizers, mutually interengaging portions on the casing and holder respectively for detachably supporting the holder on the camera independent of the lens mount, the holder supporting portion on the camera casing being spaced radially from the axis of the lens mount, the polarizers being movable in the holder, and means on the holder for transmitting movement of either polarizer to the other, one of the polarizers being in axial alinement with the lens mount when the holder is supported on the camera casing with the other polarizer projecting beyond the camera casing.

2. In combination with a camera casing having a lens mount, a holder for a pair of polarizers, a bayonet joint element on a fixed wall of the camera casing, a companion bayonet joint element on the holder, the bayonet joint element on the camera casing being spaced radially from the lens mount, the polarizers being movable in the holder, and means on the holder for transmitting movement of either polarizer to the other, one of the polarizers being in axial alinement with the lens mount when the holder is supported on the bayonet joint, while the other polarizer then projects beyond the camera casing.

3. A polarizer attachment for a camera casing comprising a tubular member, a supporting part on the tubular member adapted for engagement with a companion supporting part on a wall of the camera casing, an arm projecting in a plane at right angle to the axis of the tubular member, polarizers movably mounted in said tubular member and arm respectively, and means on the attachment for transmitting movement of one polarizer to the other, the arm projecting from the tubular holder being of such length that the polarizer mounted in the arm projects beyond the casing when the attachment is in operative position.

4. A polarizer attachment for a camera casing comprising a tubular member, an arm projecting in a plane at right angle to the axis of the tubular member at one end thereof, a supporting part for the attachment at the other end of the tubular member and adapted for engagement with a companion suporting part on a wall of a camera casing, polarizers movably mounted in said tubular member and arm respectively, and means on the attachment for transmitting movement of one polarizer to the other.

5. A polarizer attachment for a camera casing, comprising a tubular member having a supporting flange at one end adapted for engagement with a companion flange on a wall of the camera casing, an arm projecting in a plane at right angle to the axis of the tubular member from the other end thereof, polarizers movably mounted in said tubular member and arm respectively, and means on the attachment for transmitting movement of one polarizer to the other.

HEINZ KÜPPENBENDER.